(12) United States Patent
Gangotri et al.

(10) Patent No.: US 11,630,999 B2
(45) Date of Patent: Apr. 18, 2023

(54) METHOD AND SYSTEM FOR ANALYZING CUSTOMER CALLS BY IMPLEMENTING A MACHINE LEARNING MODEL TO IDENTIFY EMOTIONS

(71) Applicant: SLING MEDIA PVT LTD, Bangaluru (IN)

(72) Inventors: Arun Lokman Gangotri, Bangalore (IN); Balarama Mathukumilli, Highlands Ranch, CO (US); Debashish Sahoo, Bangalore (IN)

(73) Assignee: DISH Network Technologies India Private Limited

( * ) Notice: Subject to any disclaimer, the term of this patent is extended or adjusted under 35 U.S.C. 154(b) by 499 days.

(21) Appl. No.: 16/720,739

(22) Filed: Dec. 19, 2019

(65) Prior Publication Data

US 2021/0192332 A1 Jun. 24, 2021

(51) Int. Cl.
*G10L 15/18* (2013.01)
*G10L 15/02* (2006.01)
*G10L 15/16* (2006.01)
*G06N 3/08* (2023.01)
*G06N 3/04* (2023.01)
*G06Q 30/016* (2023.01)
*G10L 15/30* (2013.01)

(Continued)

(52) U.S. Cl.
CPC ............... *G06N 3/08* (2013.01); *G06N 3/04* (2013.01); *G06Q 30/016* (2013.01); *G10L 15/16* (2013.01); *G10L 15/22* (2013.01); *G10L 15/30* (2013.01); *G10L 21/14* (2013.01); *G10L 25/63* (2013.01)

(58) Field of Classification Search
CPC ..................................................... G10L 15/22
See application file for complete search history.

(56) References Cited

U.S. PATENT DOCUMENTS

| 11,132,993 | B1* | 9/2021 | McDaniel | G06F 40/284 |
| 2019/0253558 | A1* | 8/2019 | Haukioja | G10L 15/22 |
| 2021/0051401 | A1* | 2/2021 | Liu | G10L 15/22 |

FOREIGN PATENT DOCUMENTS

| CN | 108346436 A | * | 7/2018 | .......... G06N 3/0445 |
| CN | 111145786 A | * | 5/2020 | |

(Continued)

*Primary Examiner* — Shreyans A Patel
(74) *Attorney, Agent, or Firm* — KW Law, LLP

(57) ABSTRACT

A method and system for voice emotion identification contained in audio in a call providing customer support between a customer and a service agent by implementing an emotion identification application to identify emotions captured in a voice of the customer from audio received by a media streaming device; receiving, by the emotion identification application, an audio stream of a series of voice samples contained in consecutive frames from audio received; extracting, by the emotion identification application, a set of voice emotion features from each frame in each voice sample of the audio by applying a trained machine learning (ML) model for identifying emotions utilizing a neural networks to determine one or more voice emotions by a configured set of voice emotion features captured in each voice sample; and classifying, by the emotion identification application, each emotion determined by the trained ML model based on a set of classifying features to label one or more types of emotions captured in each voice sample.

20 Claims, 6 Drawing Sheets

(51) Int. Cl.
*G10L 25/63* (2013.01)
*G10L 21/14* (2013.01)
*G10L 15/22* (2006.01)

(56) References Cited

FOREIGN PATENT DOCUMENTS

| | | | | |
|---|---|---|---|---|
| CN | 106503646 B | * | 7/2020 | ............ G06F 40/211 |
| CN | 112216307 A | * | 1/2021 | |
| JP | 2009003162 A | * | 1/2009 | |

* cited by examiner

METHOD AND SYSTEM FOR ANALYZING CUSTOMER CALLS BY IMPLEMENTING A MACHINE LEARNING MODEL TO IDENTIFY EMOTIONS

TECHNICAL FIELD

The present invention generally relates to voice analysis in customer calls between customers and service agents and more particularly to a method and system for voice emotion recognition by implementing a trained machine learning model to track voice properties in calls between customers and agents to identify customers requiring follow-up calls based on emotions observed in each call using deep learning neural network applications.

BACKGROUND

Emotions have enormous effects on our cognition or understanding when communicating among others as emotions affect a person's ability to process information coherently, and this is particularly true when receiving unfamiliar or what a person perceives as complex information that requires the person's full attention for sufficient comprehension. For example, emotions such as anger can color people's perceptions, form their understanding and decisions, and guide their behavior while the person remains angry, regardless of whether the communications at hand are related to the source of their anger. As a result, when the persons would ordinary have no issue understanding the communications expressed at hand, because of the person's angry emotional state, the person's comprehension ability is reduced, and much of the expected understanding ability is lost. This reduced understanding ability is caused in part because the ability to form clear understanding is predicated on thoughtful, rational choices, and unpredictable emotions such as anger play a large role in disrupting the person's thought process.

The observation of voice communications can provide a good correlation with the emotional state of a person. The mood of a person can be figured out by observing the tone of the person's voice.

When providing customer services such as in a call support center for a product or service, it is often the case that the customers who are calling the support center for assistance and are in a frustrated emotional state because of their need for assistance. It is well known that frustration can lead to anger, and these heighten levels of emotions can interfere or cloud judgment the caller's ability to effectively process the communicated assistance information given by a customer service agent. Hence, while customer service agents at support centers are trained to respond to service requests in a customer call, the customer service agents generally have limited tools to recognize or respond to customers exhibiting elevated emotional states such as anger and reduced ability levels to be able to comprehend the assistance provided. Further, at such times, the customer service agents may also not be able to properly instruct the customer in his/her current emotional state.

Current systems fail to address processes for adequately recognizing elevated emotional states of a customer in a call with a customer service agent by scanning calls to identify emotions in the communicated voice between the customer and the customer service agent.

Hence, it is desirable to address these inadequacies of identifying elevated emotions in voice communications between a customer and a service agent by implementing a method and system of a machine learning model with deep neural networks to classify voice samples to identify emotions in customer calls. The present disclosure addresses at least this need.

BRIEF SUMMARY

A method and system are provided for improving the identification of emotions in customer voices in audio communications between customers and service agents by implementing a trained machine learning model using neural networks for extracting voice features and determining emotions based on the customer's voice.

In an exemplary embodiment, a method for voice emotion identification contained in audio in a call providing customer support between a customer and a service agent is provided. The method includes: implementing an emotion identification application to identify emotions captured in a voice of the customer from audio received by a media streaming device; receiving, by the emotion identification application, an audio stream of a series of voice samples contained in consecutive frames from audio received; extracting, by the emotion identification application, a set of voice emotion features from each frame in each voice sample of the audio by applying a trained machine learning (ML) model for identifying emotions utilizing a neural networks to determine one or more voice emotions by a configured set of voice emotion features captured in each voice sample; and classifying, by the emotion identification application, each emotion determined by the trained ML model based on a set of classifying features to label one or more types of emotions captured in each voice sample.

In various exemplary embodiments, the method further includes classifying, by the emotion identification application, at least one emotion type based on an intensity level of audio in a visual representation of the voice sample. One or more emotions include emotion types of angry, disgust, happy, fear, sad, surprise, and neutral emotions. The method includes predicting, by the emotion identification application, one or more emotions include one or more emotions based on a prior set of classifying features used to label each emotion captured in each voice sample. The method further includes flagging, by the emotion identification application, a particular call providing customer support based on the type of emotion. The method further includes flagging by the emotion identification application, the particular call providing customer support based on an intensity level of the audio determined by the visual representation for following up at a later time by the service agent. The method includes computing, by the emotion identification application, emotion content in each voice sample based on the voice emotion features captured in the voice sample.

In another exemplary embodiment, a computer program product tangibly embodied in a computer-readable storage device and including instructions that when executed by a processor, perform a method for emotion identification in the audio of a customer's voice is provided. The method includes implementing an emotion identification application to identify emotions captured in a voice of the customer from audio received by a media streaming device; receiving, by the emotion identification application, an audio stream of a series of voice samples contained in consecutive frames from audio received; extracting, by the emotion identification application, a set of voice emotion features from each frame in each voice sample of the audio by applying a trained machine learning (ML) model for identifying emotions utilizing a neural networks to determine one or more voice emotions based on a set of voice emotion features captured in each voice sample; and classifying, by the emotion identification application, each emotion determined by the trained ML model based on a set of classifying features to label one or more types of emotions captured in each voice sample.

In various exemplary embodiments, the method includes classifying, by the emotion identification application, at least one emotion type based on an intensity level of audio in a visual representation of the voice sample. The one or more emotions at least include one or more emotion types of angry, disgust, happy, fear, sad, surprise, and neutral emotions. The method includes predicting, by the emotion identification application, one or more emotions based on a prior set of classifying features used to label each emotion captured in each voice sample, and flagging, by the emotion identification application, a particular call providing customer support based on the type of emotion. The method includes flagging, by the emotion identification application, the particular call providing customer support based on an intensity level of the audio determined by the visual representation for following up at a later time by the service agent.

In yet another embodiment, a system for voice emotion identification contained in audio in a call providing customer support between a customer and a service agent, the system including a server configured to utilize an emotion identification application to identify emotions captured in a voice of the customer from audio received by a media streaming device, the server configured to: receive an audio stream of a series of voice samples contained in consecutive frames from audio received from the media streaming device; extract a set of voice emotion features from each frame in each voice sample of the audio by applying a trained machine learning (ML) model for identifying emotions utilizing a neural networks to determine one or more voice emotions derived by a set of voice emotion features captured in each voice sample; and classify each emotion determined by the trained ML model based on a set of classifying features to label one or more types of emotions captured in each voice sample.

Various exemplary embodiments include the server configured to: classify at least one emotion type based on an intensity level of audio in a visual representation of the voice sample. The one or more emotion at least includes one or more emotion types of angry, disgust, happy, fear, sad, surprise, and neutral emotions. The server configured to: predict one or more emotions from a set of voice emotions based on a prior set of classifying features used to label each voice emotion captured in each voice sample and flag a particular call providing customer support based on the type of emotion which has been determined. The server configured to flag the particular call providing customer support based on an intensity level of the audio determined by the visual representation for following up at a later time by the service agent and computing emotion content in each voice sample based on the voice emotion features captured in the voice sample.

This summary is provided to describe select concepts in a simplified form that are further described in the Detailed Description.

This summary is not intended to identify key or essential features of the claimed subject matter, nor is it intended to be used as an aid in determining the scope of the claimed subject matter.

Furthermore, other desirable features and characteristics of the system and method will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following drawing figures, wherein like numerals denote like elements, and wherein.

DETAILED DESCRIPTION

Figure 1:
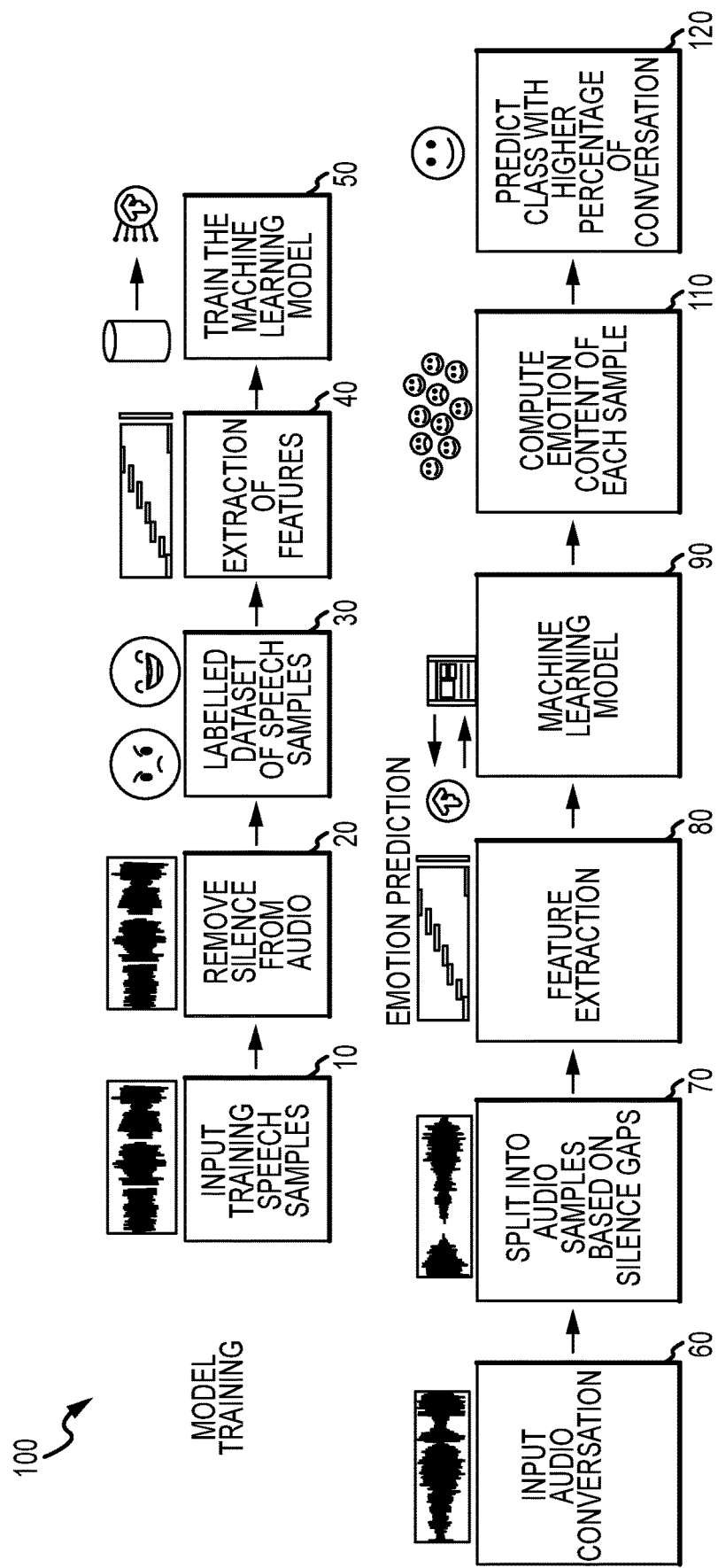
FIG. 1 illustrates an exemplary flowchart for implementing a machine learning training and predicting model of the voice emotion identification system in accordance with the exemplary embodiments described herein.

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All the embodiments described herein are exemplary embodiments provided to enable persons skilled in the art to make or use the invention and not to limit the scope of the invention that is defined by the claims. Furthermore, there is no intention to be bound by any expressed or implied theory presented in the preceding technical field, background, brief summary, or the following detailed description.

Voice recognition is the process of converting a voice signal into a sequence of words. It is also referred to as Automatic Voice Recognition (ASR) or Voice-to-Text (STT). The use of voice recognition has become ubiquitous and is used in many aspects of daily life. For example, use may be found in automotive systems or environment in which users are busy with their hands, home automation (e.g., voice command recognition systems), voice-to-text processing (e.g., word processors or emails), and personal assistants on mobile phones (e.g., APPLE®'s SIRI® on iOS, MICROSOFT®'s CORTANA® on WINDOW®s Phone, GOOGLE® Now on ANDROID®).

The process of emotion recognition or identification for tracking observed voice samples captured in live speech often requires creating large data sets for training models that implement the emotion identifying applications. This, in turn, leads to latency and bandwidth obstacles, as well as cost issues causing drawbacks and preventing widespread adoption in voice app services, and subscriber services by set-top box (STB) service providers. By utilizing artificial intelligence (AI) and machine learning (ML) techniques such as a Deep Neural Network, the voice identification can be made faster and can be performed more robustly overcoming current drawbacks incurred and making a case for the feasible implementation in communication apps utilized in enabling customer and customer service agents communications. As an example, communication apps used in conjunction with customers and STB service providers.

For example, the large amount of individualized training data, which is often required for a voice recognition training and testing model, can be reduced. By implementing the training using a Convolutional Neural Network (CNN), a type of Deep Learning Neural Network developed for image and video processing, the emotions in voice can be identified more quickly, resulting in more efficient and better-trained models developed. Hence, the steps of receiving voice samples, analyzing the voice samples, assigning importance (learnable weights and biases) to various features in each voice sample, and differentiating one from the other can be performed in part using trained machine learning models that result in less processor usage and costs.

In the various exemplary embodiment, the present disclosure describes systems and methods implementing an emotion identifying application using (CNN) neural networks that tracks emotions of a customer in a call with a service agent for determining whether or not a particular customer emotion is sufficiently elevated to require flagging and as a result for a follow up communication with the customer as deemed necessary on the part of the service agent.

In the various exemplary embodiment, the present disclosure describes systems and methods implementing an emotion identifying the application that enables quantifying listened too emotions in voice communications of a customer with an agent providing assistance for flagging the customer to agent based on the customer's perceived emotions in the voice communication. Further, providing a notifying level for the agent to know to follow up at a later time with the customer; thereby, the follow up on the part of the agent will likely be received at a time when the customer is in a better or less elevated emotional state. With a better emotional state, the customer is more likely to be able to process voice communications by the customer service agent more rationally and have an improved mindset without emotional interference of the overall customer assistance provided by the customer service agent. Further, this will likely improve service feedback on the part of the customer and/or, if necessary, lead to a better resolution to the prior service issues raised.

In various exemplary embodiments, the present disclosure describes reduced unsupervised and supervised training to create a trained model by using deep neural networks to classify emotions extracted images from voice samples that may be streamed in audio or part of video app communications (e.g., voice communications associated with live-streamed video chat). While the voice samples are described as received in live voice communication, it is contemplated that the voice emotion identification application is applicable to recorded placeshifted streamed voice samples or the like.

The present disclosure provides a voice emotion identification system that implements a machine learning (ML) application to train a model for a large labeled dataset features for emotions with category labels. The voice emotion identification application employs a two-step process of training a model by implementing the ML solution to create a trained model that contains emotion features extracted from voice samples and classifies objects of interest in accordance with labels of various emotion classes to quantify different emotion types.

FIG. 1 illustrates an exemplary flowchart for implementing a machine learning training and predicting model of the voice emotion identification system in accordance with an embodiment. In FIG. 1, initially at step 10, an input of voice conversations is received by the voice emotion identification application. The voice emotion identification application configures the voice conversations in audio samples of various data sets containing features for processing as received. The data set is representative of the voice-domain to infer various emotions from the observed voice using machine learning techniques to obtain meaningful results.

In an exemplary embodiment, the data set may be configured from a live input stream received by the voice emotion identification server connected to a set-top-box. The live video stream can either be audio samples or video with audio; in either case, the live stream contains audio in an audio voice stream for processing in samples or by consecutive frames of video stream containing an audio voice which is streamed of communications between the customer and customer service agent.

At step 20, silent portions of the voice conversations configured in voice samples received are removed for a compact audio sample containing voice. That is, at step 20, the data set is reduced in size by removal of silences in the voice sample as well as background noise, music, etc. for creating a more compact data set with interfering artifacts removed.

At step 30, a data set of voice samples is configured by the audio, which is extracted on a frame by frame basis for further semantic segmentation. In various embodiments, a provisioned data set of labeled voice or voice samples may be retrieved from a local or cloud repository connected to the voice emotion identification application for supervised training of a voice emotion identification model. The larger the available pipeline of labeled data inputted to the voice emotion identification system, the larger is the data set that can be used for training the voice feature classification model, likely leading to a better-trained model.

Various solutions have been developed for training data sets of emotions in a voice that includes the following: (1). The Ryerson Audio-Visual Database of Emotional Voice and Song (RAVDESS): This database contains 24 professional actors (12 male, 12 female), speaking two sentences in American English accent in 8 different emotions which are calm, happy, sad, angry, fearful, surprise, disgust and neutral. All the audio samples are 48 kHz sampled, and the bit depth is 16 bit. The actors are asked to speak in two intensities for each sentence and emotion; (2) The Surrey Audio-Visual Expressed Emotion (SAVEE): This database was recorded for the development of an automatic voice emotion recognition system. The database has 4 male actors speaking some English sentences in 7 different emotions like angry, disgust, happy, fear, sad, surprise, and neutral. The database has a total of 480 utterances. The data were recorded in a visual media lab with high-quality equipment and is labeled; (3) The Toronto Emotional Voice Set (TESS): The database consists of two female actors of ages 26 and 64 speaking some sentences with the format 'Say the word _____,' and there are 2000 target words filled in the sentence. The actresses were recruited from the Toronto area, and both of them speak English as their first language. The actresses were asked to speak the sentences in 7 emotions which are anger, disgust, fear, happiness, pleasant surprise, sadness, and neutral. There is a total of 2800 audio samples; (4) The Berlin Database of Emotional voice (Emo-DB): This database includes a set of actors, both male and female speaking some sentences in the Berlin language. The actors speak in emotional classes such as happy, angry, anxious, fearful, bored, disgusted, and neutral. There are more than 10 actors and 500 utterances per actor; (5) The MELD (Multimodal Emotion Lines Dataset): The MELD has more than 1400 dialogues and 13000 utterances from Friends TV series. Multiple speakers participated in the dialogues. Each utterance in dialogue has been labeled by any of these seven emotions that include: Anger, Disgust, Sadness, Joy, Neutral, Surprise, and Fear. The disadvantage with this dataset is the background music and the background laughter sounds.

At block 40, the features extracted are trained using a neural network (e.g., a convolution neural network (CNN) with inception deep convolution architecture as an example). The features in each audio sample are automatically masked and labeled. The larger the image set, the more features, and hence the labeling perform. In various exemplary embodiments, the emotion label datastore can be created with audio labeling and can be used for training and testing the trained model developed at step 50.

In various embodiments, the machine learning model in step 50 may use a short term classification based on short-period characteristics such as energy, formants, and pitch. The (acoustic) feature extraction as step 40 can include extracting a set of Mel-Frequency Cepstrum Coefficients (MFCC) coefficients for classification.

That is, in an exemplary embodiment, a set of MFCC coefficients of 13 MFCC coefficients are extracted and a first and second order derivative is derived for each of the MFCC coefficients resulting in classifying 39 features (13MFCC+13 DEL+13 DEL DEL) (i.e., statistics like mean, median, variance, maximum and minimum are calculated). This results in a total of about 195 Feature combinations. The building and training of the machine learning (ML) model involve first, for the building stage: creating multiple formants where, as an example, a set (i.e., a set of parameters) of a first five formant frequencies and formant bandwidths are extracted. From these first five formant frequencies and bandwidths, approximately 10 features derivatives are calculated, which results in making about 20 features. For each of these 20 features, additional sub-features can be derived that include statistics such as mean, median, variance, maximum, and minimum calculations. This, in turn, results in a set of about 100 features in total.

For example, for a pitch feature, a set of statistic features for pitch and derivative features can be extracted that result in a total of a set of 10 pitch features. Likewise, for a zero-crossing rate feature (ZCR), a set of feature statistics for ZCR and for derivatives of the ZCR feature are extracted, resulting in a total ZCR feature set of about 10 features. The same applicable number of features can be derived for other features such as for RMS energy features, for Voiced and Unvoiced energy Fundamental frequency: Statistics and its derivative are extracted. 10 features, Intensity: 10 features Spectral flux: 10 features Spectral bandwidth: 10 features Spectral centroid: 10 features Spectral contrast: 10 features Spectral flatness: 10 features and Spectral roll-off: 10 features.

Also, the speaking rate: the reciprocal of the average length of the voiced part of the utterance includes 1 feature, the Jitter: the shimmer includes 1 feature, the Shimmer includes 2 features (shimmer and shimmer in dB) and the harmonic to noise ratio includes 1 feature. Combining all these features results in a total of about 430 features. Though it should be noted that not every feature was used in each model generated, and further, the features for each model are selected based on importance to the model, particularly in the case with models that are generated with a varying number of features.

The voice emotion recognition application, in an exemplary embodiment, may be implemented in python using python libraries that include a sound file to read a received .wav file with voice, a parsing library such as parselmouth: to extract features like formants, intensity, jitter, shimmer, shimmer in dB, harmonic to noise ratio, a feature extraction library file like LIBROSA®: to extract features like ZCR, MFCC, RMS energy, spectral centroid, spectral bandwidth, spectral flatness, spectral roll-off, and spectral contrast; a pitch extraction library file called pysptk to extract features like pitch, fundamental frequency; a flux extraction python file called pyAudioAnalysis to extract spectral flux.

Various machine learning techniques may be implemented by the voice emotion recognition application to recognize emotions and can include techniques such as adaBoostClassifier, a decision tree, an extra trees classifier for classification and feature importance, a logistic regression, a neural network, a random forest, a support vector machine, and XGBoost Classifier. Also, Deep learning techniques such as Deep Boltzmann Machine (DBM), Recurrent Neural Network (RNN), Recursive Neural Network (RNN), Deep Belief Network (DBN), Convolutional Neural Networks (CNN) and Auto Encoder (AE) for voice emotion recognition.

Once the initial training stage is completed and the training model created, then the second phase of the emotion prediction for identifying emotions in voice conversation is implemented. This begins with step 60, of receiving an input of audio conversations between the customer and service customer agent. At step 70, the received audio conversation in a session or the like are split into segments or samples by the voice emotional identification application based on gaps or periods of silence detected in the stream of audio conversations received for faster implementing of a deep learning classification. At step 80, the feature extraction is implemented by the neural network by using various classifiers in the trained voice emotion identification model in step 90. Next, the emotion content is computed for each sample of voice at step 110. Finally, the results are configured at step 120, with the predicted class with a higher percentage as an emotion of the conversation. The higher percentage emotions are flagged and reported to the customer service agent for following up with the customer of the instructions, content, etc. communicated or discussed during that portion of the conversation to ensure proper understanding, resolution, and follow-up as needed.

In alternate exemplary embodiments, a mix-and-separate framework may be implemented in which neural networks are trained on streaming live video with audio through self-supervision to perform image segmentation and audio source separation. In this case, the process first generates a synthetic audio separation training set by mixing the audio signals from two different videos and then trains a neural network to separate the audio mixture conditioned on the visual input corresponding to one of the audio signals. The framework consists of three components: an image analysis network, an audio analysis network, and an audio synthesizer network. The learning method is self-supervised because the neural networks do not require labeled data for training.

In various exemplary embodiments, the feature extraction solution of step 80 can use GOOGLE® INCEPTION, which is a type of deep convolutional architecture with multiple levels of factorization for efficient processing of the neural network. For example, at step 80, a tensor or feature map can be implemented based on the features extracted. The tensor mapping, in this case, is highly efficient as the mapping process prevents the partition of replica feature data when the feature data set is mapped to a created tensor data set. The tensor feature map separates the features for further classification. The tensor can be passed through a single filter with pooling and Relu. The resulting 2D tensor will contain areas of higher values corresponding to higher intensities for voice emotion classifications.

At step 90, a machine learning model implementing a CNN for classification can be utilized for the voice emotion classifications. The CNN model computes a set of features for identifying the emotions of interest. The CNN model may use a selective search application to extract a large number of emotion proposals and then computes CNN features for each emotion proposal to classify each set of voice data. In alternative embodiments, the CNN model can classify each voice dataset using a class-specific linear SVMs, and further, the CNN can be built on top of any CNN structures, such as AlexNet, VGG, GoogLeNet, and ResNet.

Figure 2:
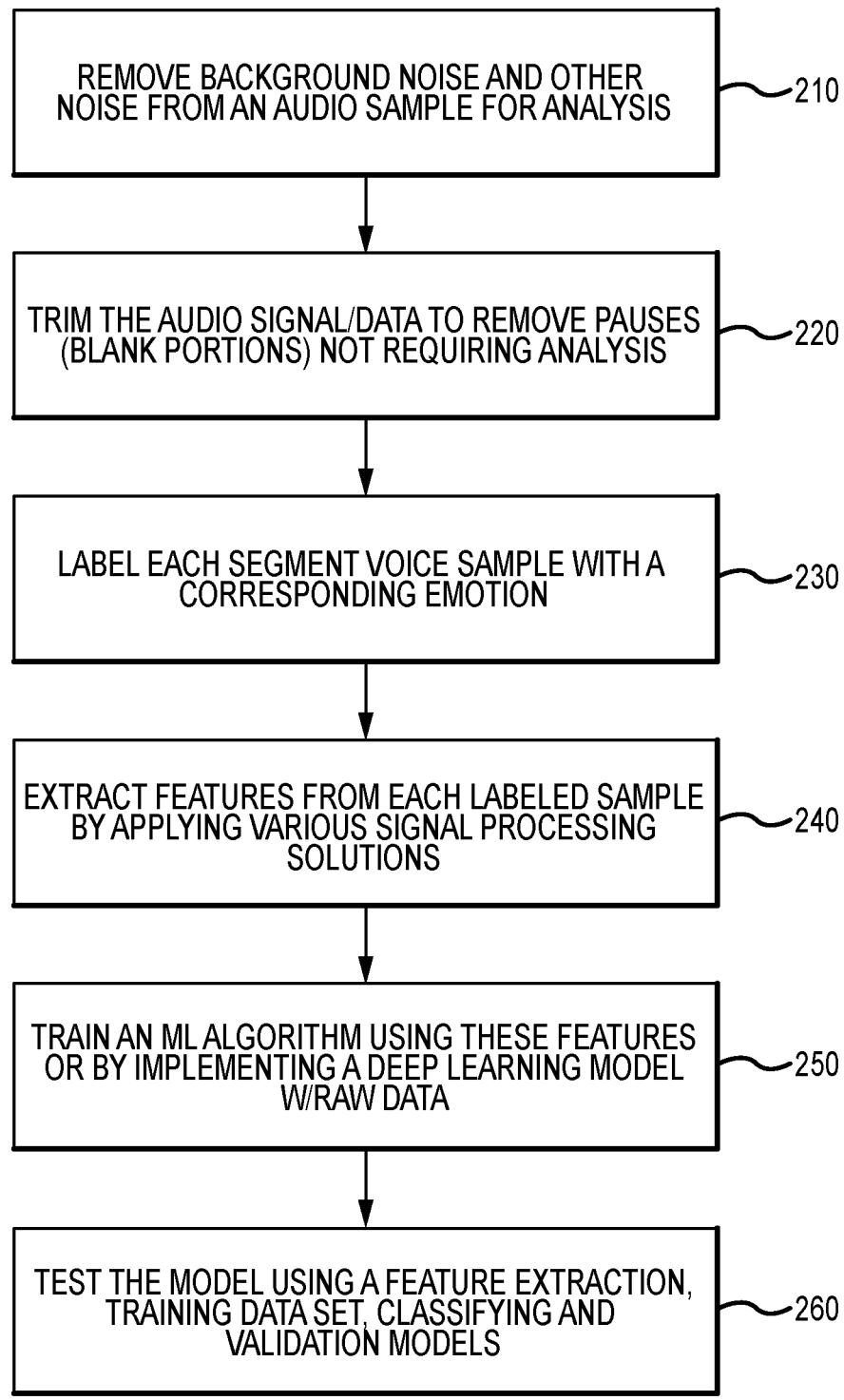
FIG. 2 illustrates an exemplary flowchart of the machine learning model used for identifying emotions in voice samples in accordance with an embodiment in accordance with the exemplary embodiments described herein.

FIG. 2 illustrates an exemplary flowchart of the machine learning model used for identifying emotions in voice samples in accordance with an embodiment. In FIG. 2, at step 210, the background noise is removed from the voice sample as well as any other background noise that may affect the emotion analysis of the conversation voice contained in the voice sample. At step 220, the audio signal is trimmed to exclude pauses in the signal where there is no voice sampled for more efficient voice emotion processing. At step 230, each of the voice segments or samples is labeled with a corresponding emotion. The labeling may be performed manually by a listener selecting one of a set of emotions that corresponds to the level of emotion detected in each sample. In alternate embodiments, the labeling may be performed automatically or semi-automatically using a variety of open-source classifier tools, for example, YOUTUBE-8M™ released by GOOGLE®. At step 240, a set of features can be extracted from each labeled audio sample to correspond with each emotion label. The features extracted can include audio file sample properties such as the number of audio channels, sample rate, bit depth, etc. . . . . . At step 250, the machine learning algorithm can be trained using these extracted features, or by implementing a deep learning model with raw audio data. As an example, the features can be extracted and identified using a visual representation for classification. Further, in this case, spectrograms can be used for visualizing the spectrum of frequencies of sound and for showing variance in short periods. The spectrogram of the audio sample can show the energy in a set of different frequency bands changing over a period of time.

In an alternate exemplary embodiment, for each audio sample in the dataset, an image representation can be generated by the voice emotion identification application using a LIBROSA® MFCC( ) function, which generates an MFCC from time series audio samples. At step 260, the trained model is tested by supervision by using the training set data, and by performing various classifying and validating operations.

Figure 3:
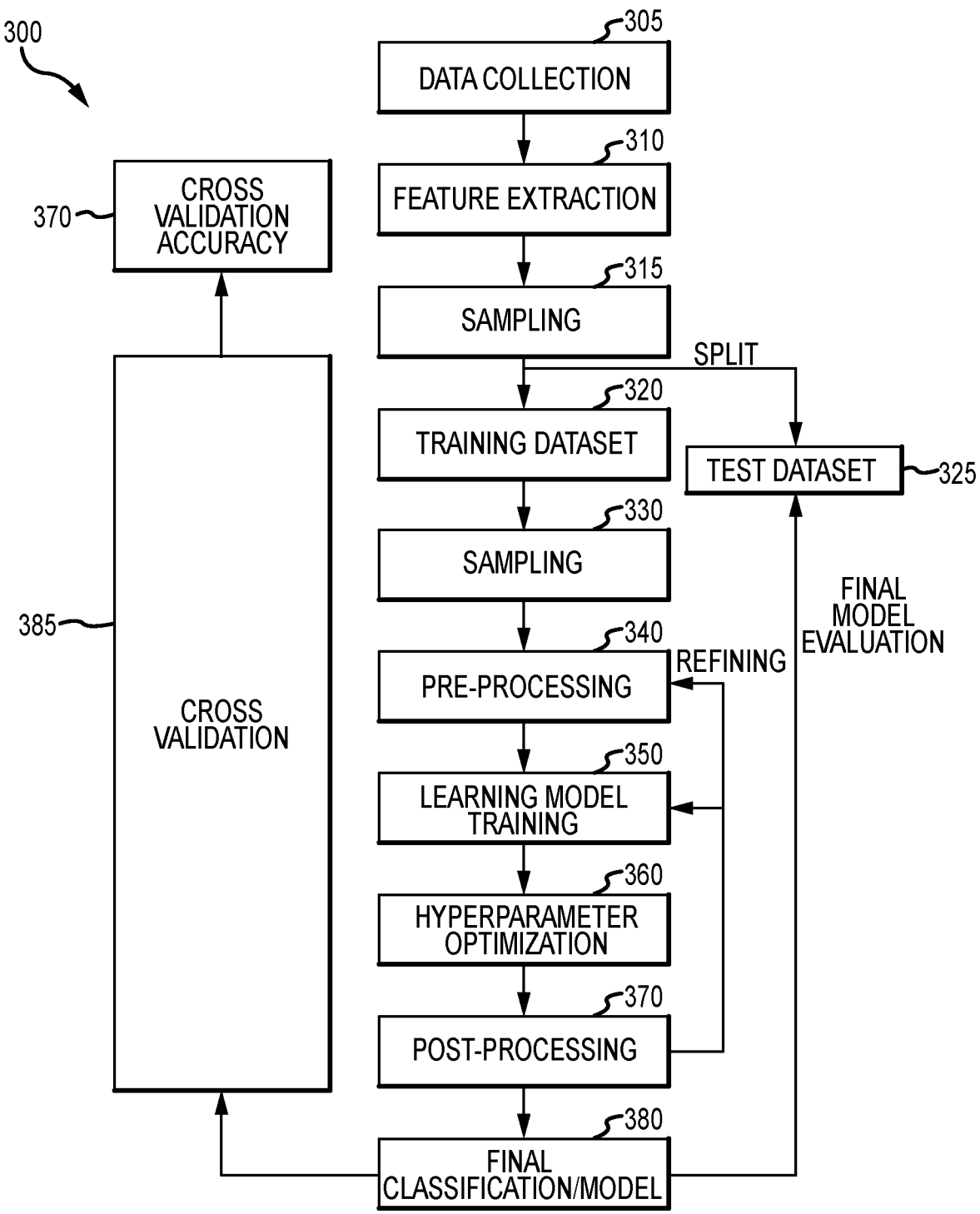
FIG. 3 illustrates an exemplary flowchart of the testing of the trained model for voice emotion identification of the voice emotion identification application in accordance with an embodiment in accordance with the exemplary embodiments described herein.

FIG. 3 illustrates an exemplary flowchart of the testing of the trained model for voice emotion identification of the voice emotion identification application in accordance with an embodiment. In FIG. 3, the testing flowchart consists of an initial step 305 of a data collection of emotion data related to voice, then performing a featuring extraction at step 310.

In an exemplary embodiment, a tensor mapping with a depth (n) can be applied for a set of features related to the voice sample. Also, pooling and activation functions (relu) can be applied to the tensors created for mapping a feature set.

Next, at step 315, operations of sampling or splitting the received audio of voice into samples are executed, and at step 320, a training set of emotion data is created that is mapped to features in the voice samples. Then, the voice emotion identification application performs sampling steps 330, and pre-processing steps 340 to train the learning model at step 350. That is, the learning model is trained by configuring a neural network with the sampled data sets to train the neural network with additional voice emotion data to create a trained model for use in identifying emotions based on features in voice samples. Next, the voice emotion identification application applies at step 360, hyperparameter optimization, and performing various post-processing steps at step 370 to arrive at a final classification model at step 380. A feedback loop 325 of the test data set is implemented in the process flow for iterative testing of datasets for enhancing the trained model. Additionally, cross-validation steps 385 and cross-validation accuracy step 390 are included in the process flow to validate the integrity of the classification of various data sets used in the final classification model at step 380.

Figure 4:
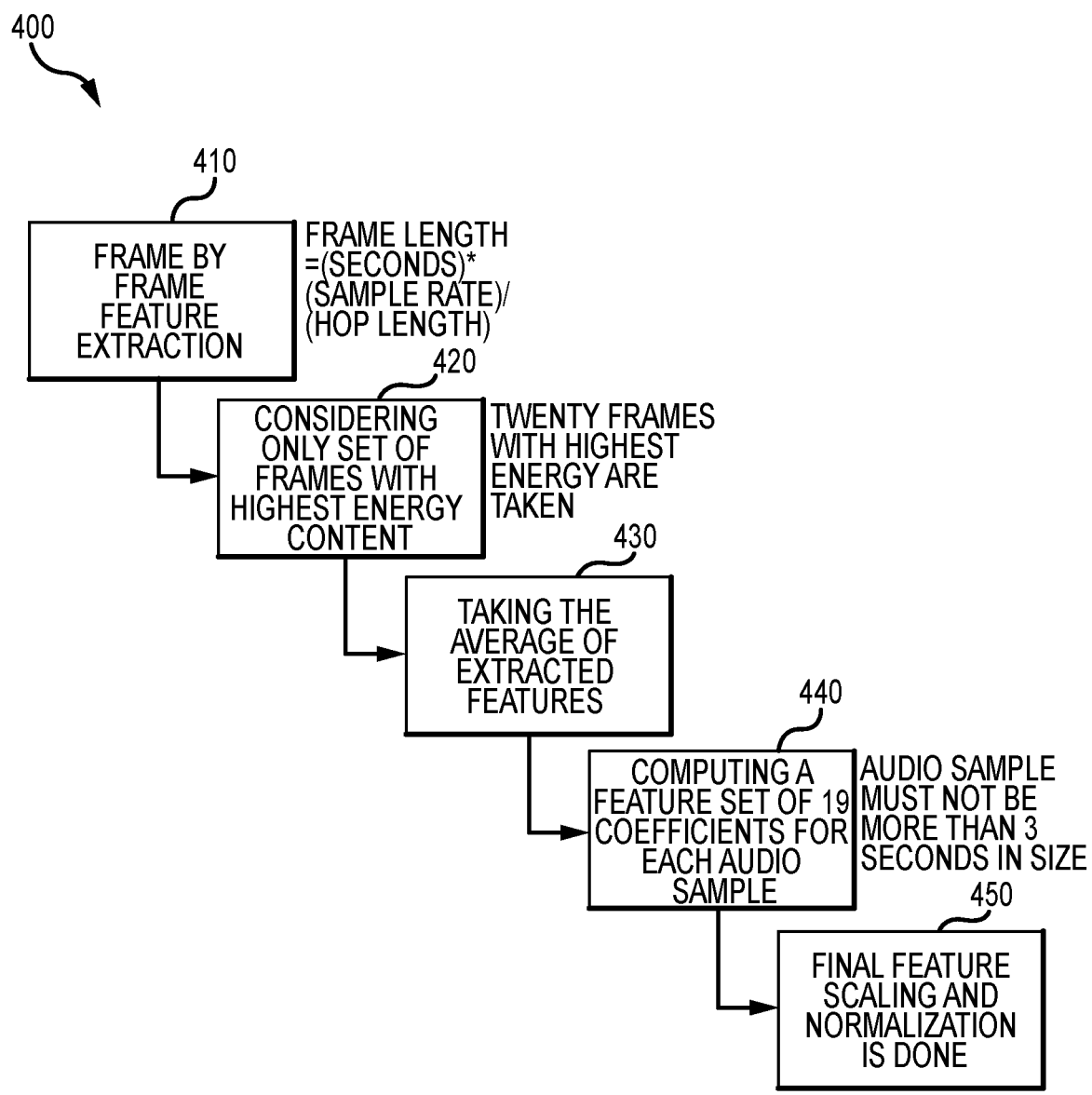
FIG. 4 illustrates an exemplary flowchart of the feature extraction process for use with the voice emotion identification application in accordance with the exemplary embodiments described herein.

FIG. 4 illustrates a flowchart of an exemplary feature extraction process for use with the voice emotion identification application in accordance with an embodiment. In FIG. 4, the flow chart 400 includes an initial step 410 of a frame by frame analysis to receive frame length data properties of each frame. Next, at step 420, the frames are selectively considered by determining only the set of frames with a higher or highest energy content of a sample of twenty (or the desired amount) of frames. Then at step 430, an average is taken of the extracted frame features. At step 440, a feature set is computed of 19 coefficients for each audio sample for an audio sample that is at least 3 seconds in length. At step 450, final feature scaling and normalization are done. In various exemplary embodiments, the feature set includes audio features of spectral flatness, spectral centroid, RMS energy, zero bandwidth crossing rate, spectral roll-off, spectral bandwidth, and Mel-frequency cepstrum (MFCC) coefficients (i.e., at least 13 coefficients).

Figure 5:
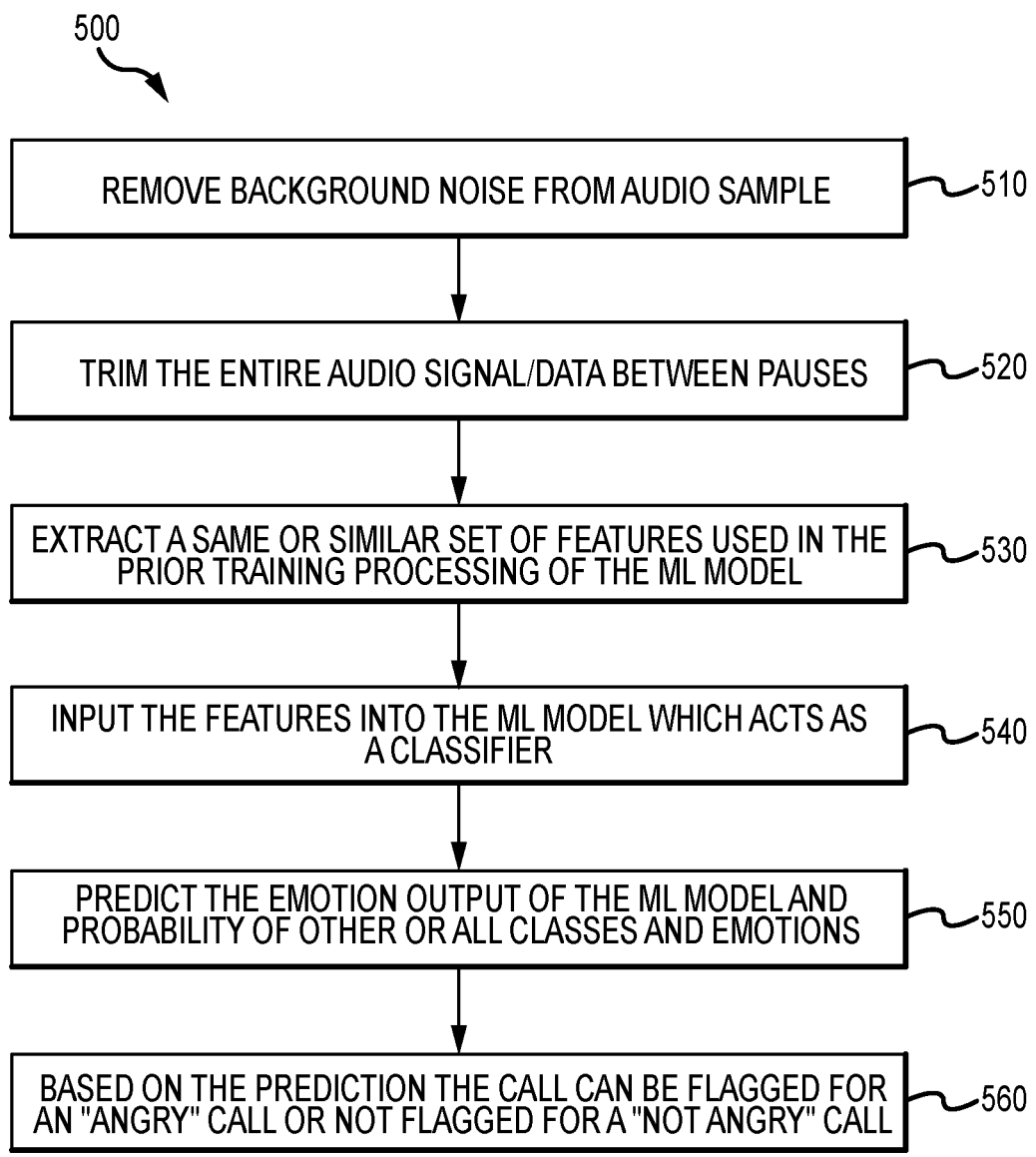
FIG. 5 is an exemplary flowchart of a process to infer or predict emotions in the voice emotion identification application in accordance with the exemplary embodiments described herein.

FIG. 5 is a flowchart of an exemplary process to infer or predict emotions in the voice emotion identification application in accordance with an embodiment. In FIG. 5, at step 510 (similar to step 210 in FIG. 2), the background noise is removed from the voice sample as well as any other background noise that may affect the emotion level analysis of the conversation voice contained in the voice sample. At step 520 (again, like step 220 of FIG. 2), the audio signal is trimmed to exclude pauses in the signal where there is no voice sampled for more efficient voice emotion processing. At step 530, a same or similar set of features is used from the prior model training (in FIG. 2, step 240 of features extracted for each emotion) for processing of the ML prediction model. In step 540, the features are input into the ML prediction model. In this case, the ML prediction model acts as a classifier to classify corresponding features to a set of predicted emotions. At step 550, the emotion identification application implements the ML prediction model to predict an emotion output based on the probabilities of each class and each emotion. At step 560, a prediction output is flagged for a case of an "angry" emotion identified for follow up, while a prediction out is not flagged in the case of a "not angry" emotion. Hence, a set of corresponding customers is predicted having an angry response by the prior feature set of the trained ML model.

Figure 6:
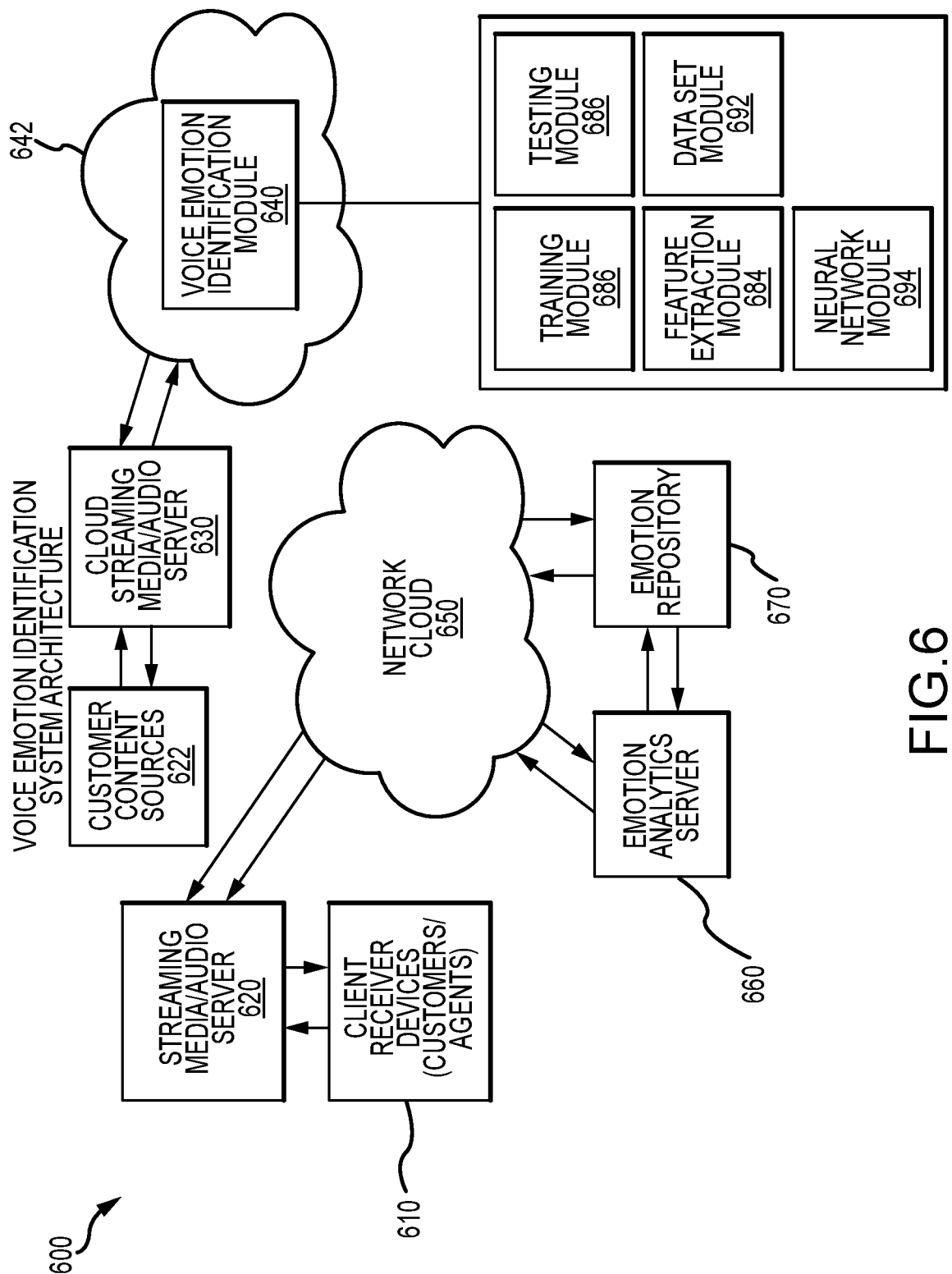
FIG. 6 illustrates a schematic diagram of a voice emotion identification system, which receives live voice communications, which is depicted in accordance with the exemplary embodiments described herein.

FIG. 6 illustrates a schematic diagram of a voice emotion identification system, which receives live voice communications, which is depicted in accordance with an embodiment of the present disclosure. In the illustrated example, the voice emotion identification system 600 can include a STB streaming media/audio server 620, a client media/audio player or client receiver device 610, a cloud streaming video content streaming server, a voice emotion identification module 640 (i.e. a module configured with a voice emotion identification application that implements a trained neural network model for classifying features to emotions), a network cloud 650, an emotion analytics server 660 for generating voice emotion analytics, a repository 670 for storing voice emotion data for various customers. The voice emotion identification module 640 includes a machine learning (ML) and testing module 680 for training and implementing a neural network model which includes various modules a feature extraction module 684, a training module 686, a testing module 688, a data set module 692, a neural network (CNN) module 694. The list of modules is merely illustrated and is contemplated that additional or different configurations of modules may be implemented as desired.

The voice emotion identification module 640 generates emotion identification data for analysis by the emotion analytics server 660. The voice emotion identification module 640 hosted on the voice emotion identification server 642 may be configured separately or part of the cloud streaming media/audio server 630. The cloud streaming media/audio server 630 receives voice content from various customer content sources 622 by communications with the voice emotion identification server 642. The voice emotion identification server 642 hosting the voice emotion identification module 640 performs various deep learning functions such as illustrated by the various modules of the ML training and testing module 680.

In an exemplary embodiment, during operation of voice emotion identification system 600, communication between the cloud streaming media/audio server 630, the STB streaming media/audio server 620 and the client receiver device 610 occurs through a network cloud 650 as well as streamed or live broadcast video/audio is exchanged with various client receiver devices 610. The communications between each server may be over wireless or wired connections to the client receiver devices 610, which in turn outputs video (and audio) signals to the client receiver devices 610.

The foregoing components (i.e., emotional level identification system and module) can each be implemented utilizing any suitable number and combination of known devices, including microprocessors, memories, power supplies, storage devices, interface cards, and other standard components. Such components may include or cooperate with any number of software programs or instructions designed to carry out the various methods, process tasks, encoding and decoding algorithms, and relevant display functions described herein. The voice emotion identification system 600 may also contain other conventionally-known components, which are not shown in FIG. 6 to avoid unnecessarily obscuring the drawing.

During a live video broadcast session, streaming video is received by the cloud streaming media/audio server 630, which is in communication with the voice emotion identification server 642, which performs emotion 660 identification functions by the voice emotion identification module 640. The voice emotion identification module 640 identifies emotions from audio transmitted by the cloud streaming media/audio server 630 transmits to the set-top box (STB) streaming server to the client receiver device 610.

With continued reference to FIG. 6, the streaming media/audio server 620 can assume the form of any device, system, or component suitable for obtaining content with objects of interest for voice emotion identification from one or more voice sources 662, encoding the audio content utilizing one or more encoder processors under the command one or more control processor and transmitting the encoded audio content to various client receiver devices 610 over the network cloud 650.

As generically shown in FIG. 6, the various modules can be implemented utilizing software, hardware, firmware, and combinations thereof. The streaming video/audio streams will often contain both video and audio component streams, which may be combined with other streaming data, including packet identification data. Any currently-known or later-developed packetized format can be employed by streaming media/audio server 620, including, but not limited to, MPEG, QUICKTIME, WINDOWS MEDIA, and/or other formats suitable for transmission over a communications network. In one implementation, streaming media/audio server 620 functions as an over-the-top (OTT) server, which provides streaming video/audio to various client receiver devices 610.

Client receiver devices 610 can be any device, system, player, or the like suitable for performing the processes described herein. A non-exhaustive list of such devices includes mobile phones, laptop computers, desktop computers, gaming consoles, tablets, Digital Video Recorders (DVRs), and Set-Top Boxes (STBs). When engaged in a streaming session, the client receiver device 610 outputs visual/audio signals. The client receiver device 610 assumes a variety of forms of a mobile phone, tablet, laptop computer, or similar electronic device having a dedicated display screen.

The client receiver device 610 may contain a processor configured to selectively execute software instructions, in conjunction with associated memory and conventional Input/output (I/O) features. The software application can be a placeshifting application in embodiments in which streaming media/audio server 620 assumes the form of an STB, DVR, or similar electronic device having placeshifting capabilities and, in many cases, located within the residence of an end-user.

Those of skill in the art will appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate the interchangeability of hardware and software, various illustrative components, blocks, modules, circuits, and steps have been described above generally in terms of their functionality.

Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that the embodiments described herein are merely exemplary implementations.

The various illustrative logical blocks, modules, and circuits described in connection with the embodiments disclosed herein may be implemented or performed with a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a controller or processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples and are not intended to limit the scope, applicability, or configuration of the invention in any way. Rather, the foregoing detailed description will provide those skilled in the art with a convenient road map for implementing an exemplary embodiment of the invention. It is understood that various changes may be made in the function and arrangement of elements described in an exemplary embodiment without departing from the scope of the invention as set forth in the appended claims.

What is claimed is:

1. A method for voice emotion identification contained in audio in a call providing customer support between a customer and a service agent, the method comprising:
   implementing an emotion identification application to identify emotions captured in a voice of the customer from audio received by a media streaming device;
   receiving, by the emotion identification application, an audio stream comprising voice samples from consecutive frames;
   selecting, by the emotion identification application, a set of frames from the consecutive frames based on energy content of the consecutive frames;
   extracting, by the emotion identification application, a set of features from each frame in the selected set of frames by applying a trained machine learning (ML) model configured to identify emotions, wherein the set of features comprises a spectral flatness, spectral centroid, spectral roll off, spectral bandwidth, zero-crossing rate, and root-mean-square energy; and
   classifying, by the emotion identification application, an emotion for each frame in the selected set of frames based on at least one of the spectral flatness, spectral centroid, spectral roll off, spectral bandwidth, zero-crossing rate, and root-mean-square energy to label the voice sample associated with each frame in the selected set of frames.

2. The method of claim 1, further comprising:
   classifying, by the emotion identification application, at least one emotion type based on an intensity level of audio in a visual representation of the voice sample.

3. The method of claim 1, wherein the emotions comprise emotion types of angry, disgust, happy, fear, sad, surprise, and neutral emotions.

4. The method of claim 1, further comprising:
   predicting, by the emotion identification application, the emotions based on a prior set of classifying features used to label each emotion captured in each voice sample.

5. The method of claim 4, further comprising:
   flagging, by the emotion identification application, a call providing customer support based on the emotion labeled in the voice sample.

6. The method of claim 2, further comprising:
   flagging, by the emotion identification application, a particular call providing customer support based on an intensity level of the audio determined by the visual representation for following up at a later time by the service agent.

7. The method of claim 1, further comprising:
   computing, by the emotion identification application, emotion content in each voice sample based on the features captured in the voice sample.

8. A computer program product tangibly embodied in a computer-readable storage device and comprising instructions that when executed by a processor, perform a method for emotion identification in audio of a customer's voice, the method comprising:

implementing an emotion identification application to identify emotions captured in a voice from audio received by a media streaming device;

receiving, by the emotion identification application, an audio stream including a series of voice samples contained in consecutive frames from the audio;

selecting, by the emotion identification application, a set of frames from the consecutive frames based on energy content of the consecutive frames;

extracting, by the emotion identification application, a set of features from each frame in the selected set of frames by applying a trained machine learning (ML) model configured to identify emotions, wherein the set of features comprises a spectral flatness, spectral centroid, spectral roll off, spectral bandwidth, zero-crossing rate, and root-mean-square energy; and classifying, by the emotion identification application, an emotion for each frame in the selected frames based on at least one of the spectral flatness, spectral centroid, spectral roll off, spectral bandwidth, zero-crossing rate, and root-mean-square energy to label the voice sample associated with each frame in the selected set of frames.

9. The computer program product of claim 8, wherein the method further comprises:

classifying, by the emotion identification application, at least one emotion type based on an intensity level of audio in a visual representation of the voice sample.

10. The computer program product of claim 8, wherein the emotions comprise one or more of angry, disgust, happy, fear, sad, surprise, and neutral emotions.

11. The computer program product of claim 8, wherein the method further comprises:

predicting, by the emotion identification application, one or more emotions based on a prior set of classifying features used to label each emotion captured in each voice sample.

12. The computer program product of claim 11, wherein the method further comprises:

flagging, by the emotion identification application, a call providing customer support based on the emotion labeled in the voice sample.

13. The computer program product of claim 8, wherein the method further comprises:

flagging, by the emotion identification application, a particular call providing customer support based on an intensity level of the audio determined by a visual representation for following up at a later time by a service agent.

14. A system for identifying voice emotion, the system comprising:

a server configured to utilize an emotion identification application to identify emotions captured in audio received by a media streaming device, the server configured to:

receive an audio stream including a series of voice samples contained in consecutive frames from audio received from the media streaming device;

select a set of frames from the consecutive frames based on energy content of the consecutive frames;

extract a set of features from each frame in the selected set of frames by applying a trained machine learning (ML) model to identify emotions, wherein the set of features comprises a spectral flatness, spectral centroid, spectral roll off, spectral bandwidth, zero-crossing rate, and root-mean-square energy; and classify an emotion for each frame in the selected set of frames based on at least one of the spectral flatness, spectral centroid, spectral roll off, spectral bandwidth, zero-crossing rate, and root-mean-square energy to label the voice sample associated with each frame in the selected set of frames.

15. The system of claim 14, wherein the server is configured to classify at least one emotion type based on an intensity level of audio in a visual representation of the voice sample.

16. The system of claim 14, wherein the one or more emotion at least comprises one or more emotion types of angry, disgust, happy, fear, sad, surprise, and neutral emotions.

17. The system of claim 14, wherein the server is configured to predict one or more emotions from a set of voice emotions based on a prior set of classifying features used to label each voice emotion captured in each voice sample.

18. The system of claim 15, wherein the server is configured to flag a call based on emotion labeled in the voice sample.

19. The system of claim 16, wherein the server is configured to flag a particular call providing customer support based on an intensity level of the audio determined by a visual representation for following up at a later time by a service agent.

20. The system of claim 16, wherein the server is configured to compute emotion content in each voice sample based on the voice emotion features captured in the voice sample.

* * * * *